United States Patent
Allen

(10) Patent No.: US 8,515,737 B2
(45) Date of Patent: Aug. 20, 2013

(54) SYSTEMS FOR DYNAMICALLY GENERATING AND PRESENTING NARRATIVE CONTENT

(75) Inventor: Robert C Allen, Cary, NC (US)

(73) Assignee: Automated Insights, Inc., Durham, NC (US)

( * ) Notice: Subject to any disclaimer, the term of this patent is extended or adjusted under 35 U.S.C. 154(b) by 270 days.

(21) Appl. No.: 13/081,052

(22) Filed: Apr. 6, 2011

(65) Prior Publication Data

US 2011/0246182 A1    Oct. 6, 2011

Related U.S. Application Data

(60) Provisional application No. 61/321,487, filed on Apr. 6, 2010, provisional application No. 61/359,470, filed on Jun. 29, 2010.

(51) Int. Cl.
*G06F 17/27* (2006.01)

(52) U.S. Cl.
USPC ............................ 704/9; 704/1; 704/10

(58) Field of Classification Search
USPC .................................... 704/1, 9, 10
See application file for complete search history.

(56) References Cited

U.S. PATENT DOCUMENTS

| | | | |
|---|---|---|---|
| 6,976,031 B1 * | 12/2005 | Toupal et al. | 1/1 |
| 7,246,315 B1 | 7/2007 | Andrieu et al. | |
| 7,333,967 B1 * | 2/2008 | Bringsjord et al. | 706/45 |
| 7,856,390 B2 * | 12/2010 | Schiller | 705/36 R |
| 8,355,903 B1 * | 1/2013 | Birnbaum et al. | 704/9 |
| 8,374,848 B1 * | 2/2013 | Birnbaum et al. | 704/9 |
| 2003/0056116 A1 * | 3/2003 | Bunker et al. | 713/201 |
| 2004/0148248 A1 | 7/2004 | Allen et al. | |
| 2008/0193101 A1 * | 8/2008 | Agnihotri et al. | 386/52 |
| 2009/0100046 A1 | 4/2009 | Huck | |
| 2009/0326948 A1 | 12/2009 | Agarwal et al. | |
| 2010/0049852 A1 * | 2/2010 | Whitnah et al. | 709/226 |
| 2010/0132049 A1 * | 5/2010 | Vernal et al. | 726/27 |
| 2010/0299324 A1 * | 11/2010 | Truv et al. | 707/725 |
| 2011/0087486 A1 * | 4/2011 | Schiller | 704/9 |
| 2012/0079004 A1 * | 3/2012 | Herman | 709/203 |

OTHER PUBLICATIONS

International Search Report and Written Opinion for International Application No. PCT/US11/31380, mailed Jun. 7, 2011.

* cited by examiner

*Primary Examiner* — Douglas Godbold

(74) *Attorney, Agent, or Firm* — Cooley LLP

(57) ABSTRACT

In some embodiments, a non-transitory processor-readable medium stores code representing instructions that when executed cause a processor to select a narrative content template based at least in part on a predetermined content type associated with a real-world and/or virtual event. The code further represents instructions that when executed cause the processor to select a narrative tone type. The code further represents instructions that when executed cause the processor to, for each phrase included in an ordered set of phrases associated with the narrative content template, select, based at least in part on the narrative tone type, a phrase variation from a set of phrase variations associated with that phrase, and define, based on the selected phrase variation and at least one datum from a set of data, a narrative content portion associated with the real-world event. The code further represents instructions that when executed cause the processor to output, at a display, the narrative content portion.

27 Claims, 5 Drawing Sheets

SYSTEMS FOR DYNAMICALLY GENERATING AND PRESENTING NARRATIVE CONTENT

CROSS REFERENCE TO RELATED APPLICATIONS

The present application claims the benefit under 35 U.S.C. 119(e) of U.S. provisional patent application No. 61/359,470, entitled "Automatically Generated Event Content" filed on Jun. 29, 2010, and U.S. provisional patent application No. 61/321,487, entitled "Methods and Systems for Dynamically Generating and Presenting Sports Content" filed on Apr. 6, 2010, both of which are hereby incorporated by reference in their entireties.

BACKGROUND

Some embodiments described herein relate generally to programmatically-generated narrative content, and more particularly to programmatically- and dynamically-generated narrative content associated with one or more events, occurrences, facts, persons, places and/or things.

As content providers have moved to broaden and deepen their own news and other media offerings, they have accordingly sought ways to improve efficiency and minimize the cost of content generation. Among such organizations' greatest expenses are the salary and operating costs inherent in maintaining a journalistic staff of reporters and editors. Thus, a need exists for systems and methods that enable a content provider to generate narrative content without the use of a human writer and editor. More specifically, a need exists for systems and methods to dynamically generate and present narrative content based on one or more events, occurrences, facts, persons, places and/or things, such as sporting events, teams and/or players, financial institutions and/or markets, weather conditions, general news items, and/or the like.

SUMMARY

In some embodiments, a non-transitory processor-readable medium stores code representing instructions that when executed cause a processor to select a narrative content template based at least in part on a predetermined content type associated with a real-world event. The code further represents instructions that when executed cause the processor to select a narrative tone type. The code further represents instructions that when executed cause the processor to, for each phrase included in an ordered set of phrases associated with the narrative content template, select, based at least in part on the narrative tone type, a phrase variation from a set of phrase variations associated with that phrase, and define, based on the selected phrase variation and at least one datum from a set of data, a narrative content portion associated with the real-world event. The code further represents instructions that when executed cause the processor to output, at a display, the narrative content portion.

DETAILED DESCRIPTION

In some embodiments, a non-transitory processor-readable medium stores code representing instructions that when executed cause a processor to select a narrative content template based at least in part on a predetermined content type associated with a real-world and/or virtual event. The code further represents instructions that when executed cause the processor to select a narrative tone type. The code further represents instructions that when executed cause the processor to, for each phrase included in an ordered set of phrases associated with the narrative content template, select, based at least in part on the narrative tone type, a phrase variation from a set of phrase variations associated with that phrase, and define, based on the selected phrase variation and at least one datum from a set of data, a narrative content portion associated with the real-world and/or virtual event. The code further represents instructions that when executed cause the processor to output, at a display, the narrative content portion.

Figure 1:
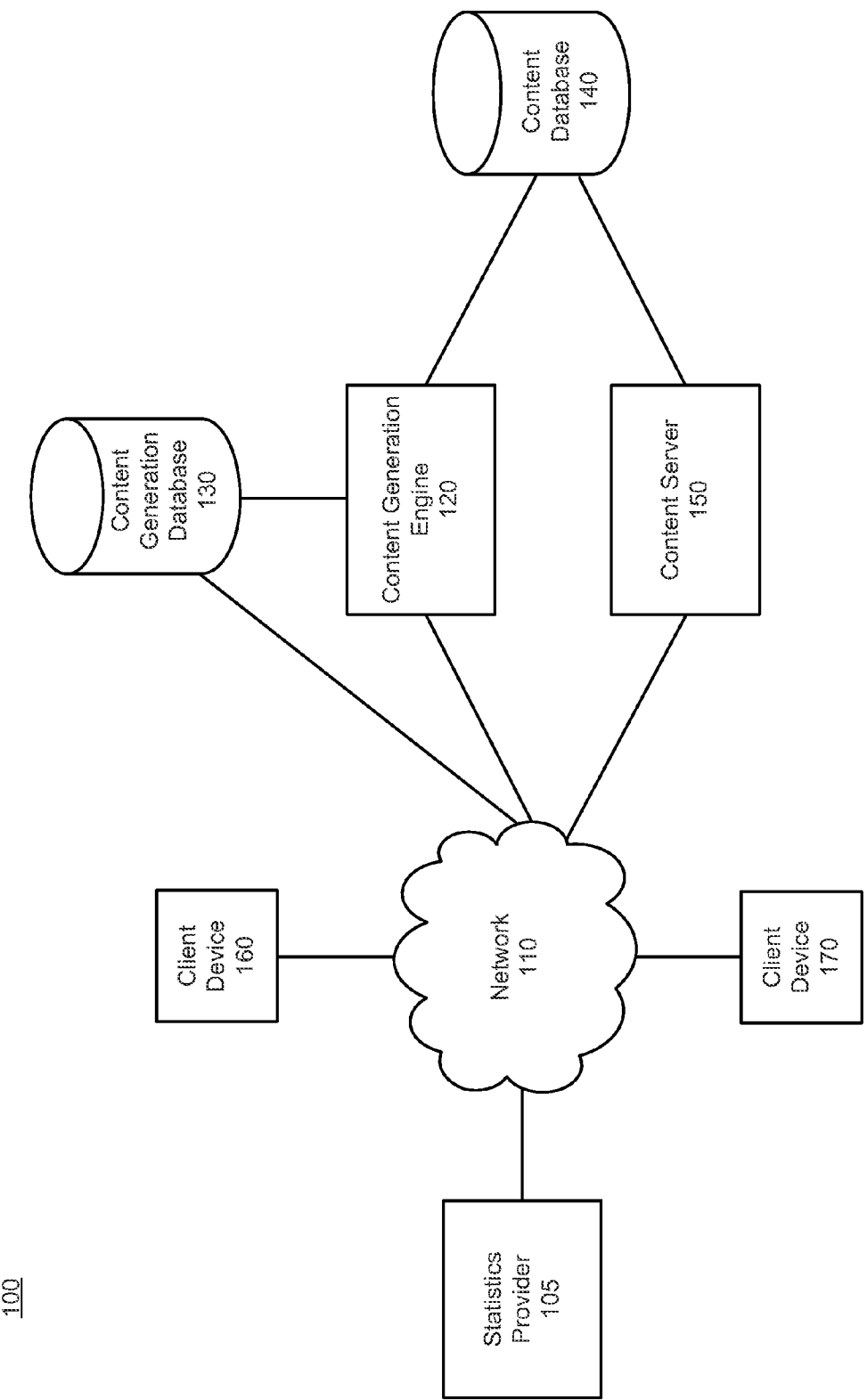
FIG. 1 is a schematic block diagram that illustrates a narrative content generation system, according to an embodiment.

FIG. 1 is a schematic block diagram that illustrates a narrative content generation system, according to an embodiment. More specifically, FIG. 1 illustrates a narrative content generation system 100 that includes an external statistics provider 105 operatively coupled to a content generation engine 120 and to a template and statistics database 130 via a network 110. The content generation engine 120 is further coupled to the content generation database 130 and to a content database 140. The content database 140 is coupled to a content server 150, which is operatively coupled to a client device 160 and to a client device 170 via the network 110.

The statistics provider 105 can be any service that provides statistics (e.g., sports statistics, financial market statistics), news information (e.g., newswires, weather forecasts and data), and/or other information associated with a past, current, or future real-world event, person, place and/or thing. The statistics provider 105 can further provide statistics, news information and/or other information associated with one or more virtual events (e.g., information, data and/or statistics associated with a video game, a fantasy sports league and/or team, etc.) For example, the statistics provider 105 can be a sports statistics service that provides substantially real-time data associated with completed, in-progress and/or scheduled sporting events (e.g., completed game statistics, in-game statistics), one or more athletes, teams and/or leagues (e.g., player statistics, team statistics, injury reports, season statistics), etc. In another example, the statistics provider 105 can be a weather information service that provides weather reports, forecasts, current conditions (e.g., temperature, barometric pressure), map information (e.g., satellite maps, radar maps), etc.

Although not shown in FIG. 1, in some embodiments the statistics provider 105 can itself receive one or more information reports (e.g., statistic reports) from one or more other sources (not shown in FIG. 1). In such embodiments, the statistics provider 105 can aggregate received information for subsequent transmission to the content generation engine 120 and/or the content generation database 130 via the network 110. In such embodiments, the statistics provider 105 can send the information from a single physical location. Alternatively, the statistics provider 105 can send data from multiple physical locations, each physical location being associated and/or affiliated with the statistics provider 105. In some embodiments, the statistics provider 105 can be owned, operated and/or administered by a third-party entity not related and/or affiliated with the other elements of the narrative content generation system.

The network 110 can be any computer or information network capable of marshalling, transmitting, routing, directing and/or forwarding data between two or more hardware devices and/or software modules. For example, the network 110 can be a local area network (LAN), a wide area network (WAN) or the Internet. In some embodiments, the network 110 can be comprised of one or more wired and/or wirelessly connected hardware devices. As shown in FIG. 1, the network 110 can operatively couple and/or connect the statistics provider 105 to the content generation engine 120 and/or the content generation database 130. As also shown in FIG. 1, the network 110 can operatively couple and/or connect either or both of the client device 160 and the client device 170 to the content server 150.

The content generation engine 120 can be any combination of hardware and/or software (executing in hardware) configured to define narrative content based at least in part on information received from the statistics provider 105 and/or the content generation database 130. The content generation engine 120 can be, for example, a server device executing one or more software modules configured to combine information (e.g., statistics and/or other data received from the statistics provider 105 and/or the content generation database 130) with a narrative content template (e.g., a narrative content template selected from the content generation database 130) to define a narrative content portion (e.g., an article, report, summary, preview, bullet point, short-form text, etc.). The received information can be, for example, statistics information and/or data associated with a given event, occurrence, fact, person, place and/or thing (e.g., sports statistics information, weather history or forecast information, etc.). In addition to the narrative content template, the content generation engine 120 can also receive, from the content database 130, one or more phrases and/or phrase variations associated with the selected narrative content template.

In some embodiments, the content generation engine 120 can be and/or can include multiple hardware modules and/or devices included in a single chassis and/or located within or as separate physical devices. Alternatively, the content generation engine 120 can include multiple physical devices operatively and/or physically coupled via a network (e.g., a private network (not shown in FIG. 1)).

The content generation database 130 can be a database and/or a database server storing one or more databases including one or more narrative content templates, identifiers of one or more persons, places, things, facts, events, occurrences, sports leagues, teams and/or athletes, locations, forecasts, etc., and/or statistics and/or other information associated with the same. Additionally, the content generation database 130 can store phrases, phrase variations, tone types, themes and/or theme types, and/or other information associated with one or more narrative content templates. In some embodiments, the content generation database 130 can include one or more relational databases including one or more relational database tables. For example, the content generation database 130 can include one or more Oracle, Microsoft SQL Server, MySQL, PostgreSQL, Informix and/or other databases storing the information described above.

The content database 140 can be a database and/or a database server storing one or more databases including one or more previously-generated narrative content portions defined by the content generation engine 120. In some embodiments, the content database 140 can include one or more relational databases including one or more relational database tables, similar in structure, type, format, hierarchy and/or organization to those/that included in the content generation database 130. Although not shown in FIG. 1, the content database 140 can be included in and/or stored at the same physical device as the content generation database 130. In such embodiments, one or more tables of the content database 140 can optionally be included in the same database as the content generation database 130. Alternatively, one or more portions of the content database 140 (e.g., entire databases and/or relational database tables) can be stored across multiple devices, such as database server devices (not shown in FIG. 1).

The content server 150 can be any combination of hardware and/or software (executing in hardware) configured to serve (i.e., send) narrative content (e.g., previously-generated narrative content stored in the content database 140) to one or more client devices. As shown in FIG. 1, the content server 150 is operatively coupled, via the network 110, to the client device 160 and to the client device 170. Thus, the content server 150 can be configured to send narrative content to either or both of the client device 160 and the client device 170. Although not shown in FIG. 1, in some embodiments, the content server 150 can serve narrative content to any number of client devices connected via the network 110. In this manner, the content server 150 can send programmatically-generated narrative content for consumption by one or more users of one or more client devices. Although not shown in FIG. 1, the content server 150 can optionally be a physical device operatively coupled to the content database 140. Alternatively, the content server 150 can be a software module executing at a computing device, such as a server device at which any of the content generation engine 120, the content generation database 130 and/or the content database 140 is hosted. In some embodiments, the content server 150 can serve previously-generated narrative content via one or more web servers and/or application servers executing thereat. For example, the content server 150 can host and/or execute a version of the Apache or Microsoft Internet Information Server (IIS) web servers to facilitate access to the narrative content by client devices.

Each of the client device 160 and the client device 170 can be any computing device (e.g., a personal computer, laptop, notebook, netbook, tablet, smartphone, mobile computing device) configured to receive and/or display narrative content received from the content server 150 via the network 110. For example, the client device 160 can be a personal desktop computer executing a web browser or other client application capable of receiving (e.g., from a web server) and displaying dynamically-defined narrative content similar to that described above. In some embodiments, the client device 170 can be, for example, a mobile telephone (e.g., a web-enabled smartphone) capable of communicating, via the Internet, with one or more web servers and/or databases. In such embodiments, the client device 170 can receive one or more narrative content portions, articles, reports, etc. and/or display the same for viewing by a user. Although only two client devices are shown in FIG. 1, in some embodiments any number of compatible client devices can be operatively and/or physically coupled to the network 110, and thus capable of receiving and/or displaying previously-generated narrative content received from the content server 150.

Figure 2:
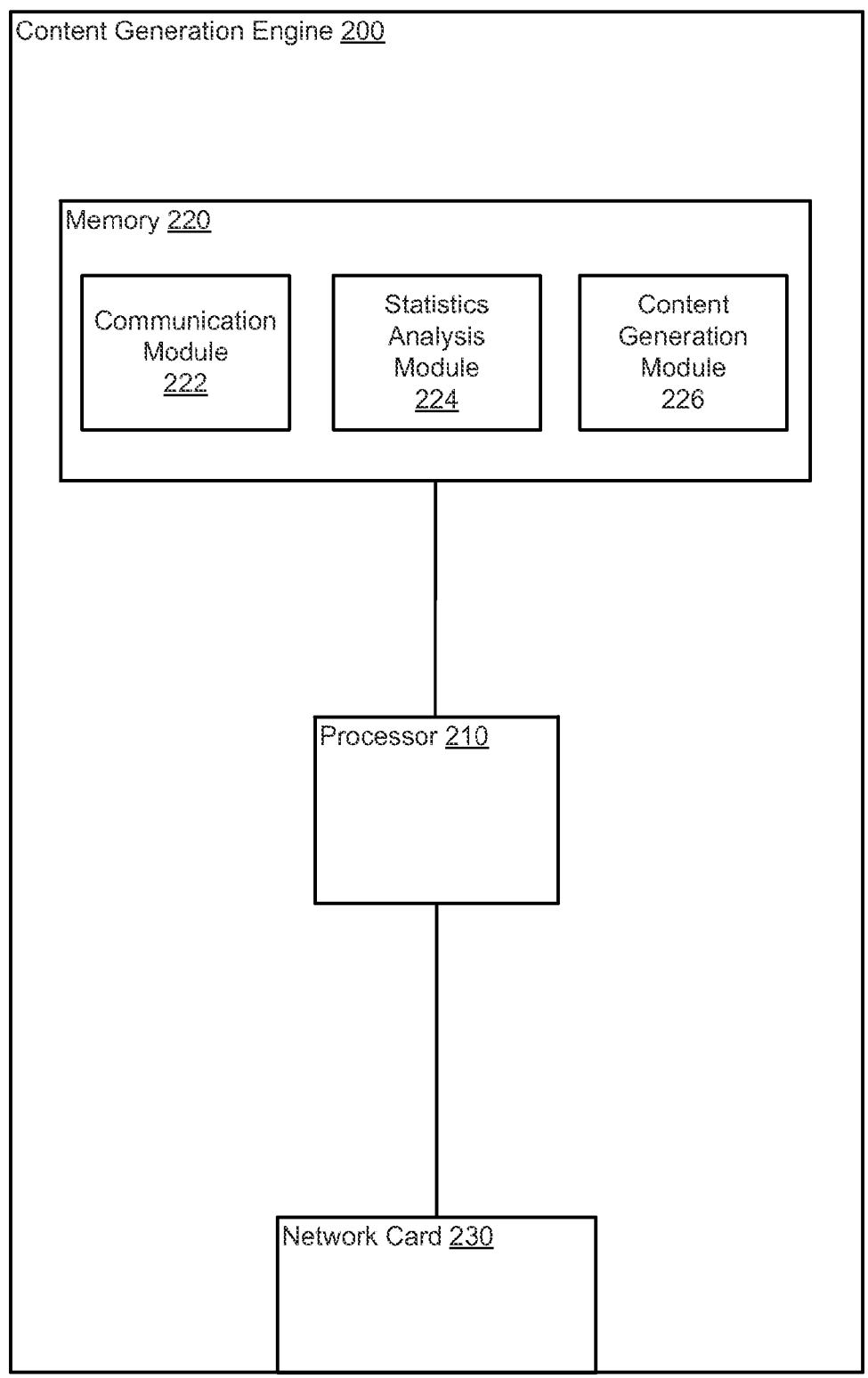
FIG. 2 is a schematic diagram that illustrates a content generation engine having multiple hardware components and storing multiple software modules, according to another embodiment.

FIG. 2 is a schematic diagram that illustrates a content generation engine having multiple hardware components and storing multiple software modules, according to another embodiment. More specifically, FIG. 2 is a system block diagram of a content generation engine 200, similar to the content generation engine 150 described in connection with FIG. 1 above. The content generation engine 200 includes a processor 210 operatively coupled to a memory 220 and to a network card 230. As shown in FIG. 2, the memory 220 includes three software modules: a communication module 222, a statistics analysis module 224 and a content generation module 226. In some embodiments, the content generation engine 200 can include additional hardware modules and/or software modules (executing in hardware) not shown in FIG. 2. For example, the content generation engine 200 can include one or more input devices and/or peripherals, one or more data input ports, etc.

The processor 210 can be any processor (e.g., a central processing unit (CPU), an application-specific integrated circuit (ASIC), a field programmable gate array (FPGA)) configured to execute one or more instructions received from, for example, the memory 220. In some embodiments, the processor 210 can be a Reduced Instruction Set (RISC) processor. As shown in FIG. 2, the processor 210 can be in communication with any of the memory 220 and the network card 230. In some embodiments, the processor 210 can accordingly send information (e.g., data, instructions and/or network data packets) to and/or receive information from any of the memory 220 and the network card 230.

The memory 220 can be any memory (e.g., a RAM, a ROM, a hard disk drive, an optical drive, other removable media) configured to store information (e.g., an operating system, one or more software applications, statistics and/or news information, media content, text content, etc.). As shown in FIG. 2, the memory 220 can include the communication module 222, the statistics analysis module 224 and the content generation module 226. In some embodiments, the memory 220 can include instructions (e.g., code) sufficient to define and/or execute the communication module 222, the statistics analysis module 224 and the content generation module 226.

The communication module 222 can include software instructions (e.g., code) configured to cause the processor 210 to exchange information (e.g., data packets, data cells) with another hardware device. For example, the communication module 222 can include instructions configured to cause the processor 210 and/or the network card 230 to receive statistics and/or other information from a statistics provider (e.g., the statistics provider 105 of FIG. 1). The communication module 222 can also include instructions configured to cause the processor 210 and/or the network card 230 to exchange one or more data packets with one or more databases (e.g., the content generation database 130 and/or the content database 140 of FIG. 1). Although not shown in FIG. 2, in some embodiments, the communication module 222 can be any valid combination of hardware and/or software, including, e.g., an ASIC, an FPGA, a firmware module, etc.

The statistics analysis module 224 can include software instructions (e.g., code) configured to cause the processor 210 to analyze one or more statistics and/or other information received and/or stored at the content generation engine 200 (at, e.g., the memory 220 and/or another memory included in and/or coupled to the content generation engine 200). For example, the statistics analysis module 224 can be configured to compute one or more derivative statistics and/or metrics based at least in part on received statistics and/or other information (e.g., statistics received from the content generation database 130 of FIG. 1). Although not shown in FIG. 2, in some embodiments, the statistics analysis module 224 can be any valid combination of hardware and/or software, including, e.g., an ASIC, an FPGA, a firmware module, etc.

The content generation module 226 can include software instructions (e.g., code) configured to cause the processor 210 to define a new narrative content portion (e.g., an article, report, summary, preview, bullet point, sentence, paragraph, vignette, etc.). Although not shown in FIG. 2, in some embodiments, the content generation module 226 can be any valid combination of hardware and/or software, including, e.g., an ASIC, FPGA, a firmware module, etc. In an example, the content generation module 226 can include instructions to receive a request to define a new narrative content portion associated with a specified sporting event, such as a basketball game played at a specified venue between two opposing teams comprised of multiple players. In the example, the content generation module 226 can receive an event identifier (ID) associated with the basketball game, and can accordingly perform one or more database queries for statistics and/or information associated with that event ID in a database (e.g., the content generation database 130 of FIG. 1). Thus, in the example, the content generation module 226 can receive event, league, team and/or player statistics associated with the event ID, such as an event location and starting time, a league name, one or more team names and/or win/loss records, one or more player names, jersey numbers, personal characteristics and/or previous performance statistics, etc.

Although not shown in FIG. 2, the received statistics and/or other information can be of varying levels of granularity, and can include, in the example, home and road split statistics for team win/loss records or other performance statistics, in-conference and/or out-of-conference team win/loss records, etc. In some embodiments, the received statistics and/or other information can include identifiers, such as team IDs, player/participant IDs, venue IDs, etc. In such embodiments, the content generation module 226 can perform (i.e., send) subsequent queries to the content generation database 230, such that statistics, identifiers and/or other information associated with each of the above is returned back to the content generation module 226 for use in defining the narrative content portion.

Upon receipt of the above-described information, the content generation module 226 can select a narrative content template for use in defining the narrative content portion. In some embodiments, the content generation module 226 can first determine a template type for use in selecting the narrative content template itself. The template type can be determined based on, for example, a template type identifier received in conjunction with the event ID.

Alternatively, the template type can be determined based at least in part on user input and/or based on a content type associated with the event (e.g., a content type associated with the event ID in the content generation database 230). Alternatively or additionally, the template type can be determined based at least in part on a content type associated with a real-world event, including an occurrence, fact, person, place and/or thing about or for which the narrative content will be defined. Alternatively or additionally, the template type can be determined based at least in part on a content type associated with one or more virtual events (e.g., information, data and/or statistics associated with a video game, a fantasy sports league and/or team, etc.), including an occurrence, fact, character, result and/or other information about which the narrative content will be defined. The template type can be, for example, an event preview template type, an in-progress event report template type, an event summary template type, etc.

Having determined the template type, the content generation module 226 can next select, from a database, a narrative content template of the selected template type. For example, the content generation module 226 can send a query to a content generation database (e.g., the content generation database 130 of FIG. 1) for a list of narrative content templates of the selected template type, from which it can select a single narrative content template for use in defining the narrative content portion. Alternatively, the content generation module 226 can send a request to the content generation database 230 for a single, randomly-selected or pseudo-randomly-selected narrative content template of the selected template type. In this manner, the content generation module 226 can ensure that, on average, the set of narrative content templates used by the content generation engine 226 to define narrative content includes at least a minimum degree of variety.

Alternatively, the content generation module 226 can request, from the content generation database 230, a specified narrative content template of the selected template type (e.g., a template specified by user input). For example, the content generation module 226 can request a specified narrative content template that includes text associated with a given theme, such as a series of events, an ongoing topic of interest, etc. In a more specific example, the content generation module 226 can request or select a narrative content template associated with, for example, a sports tournament and/or period of a sports season (e.g., a playoff period, conference championship week period, etc.). In some embodiments, the selected narrative content template can include text associated with and/or based at least in part on a predefined author style, such as a writing or composition style of a given author, journalist or other individual. In such embodiments, the selected narrative content template can include phrases and/or phrase variations constructed in a similar style, fashion and/or manner to those of the author, journalist or other individual.

Once it has received the selected narrative content template, the content generation module 226 can optionally determine, define, or select a narrative tone to be associated with the new narrative content portion. In some embodiments, the content generation module 226 can analyze the received statistics and/or other information to determine which narrative tone would be appropriate based on the received information. For example, if the received statistics and/or other information indicates a positive event, or likely positive outcome to an event, occurrence, etc., the content generation module 226 can define or select a positive, sanguine, energetic, hopeful, or other similar tone. In a more specific example, the narrative tone can be selected based at least in part on a recent or historic performance of one or more sports teams and/or athletes, on one or more participant rankings, on a physical location of the event or occurrence, and/or on information associated with another individual or group of individuals included or mentioned in the received statistics and/or other information. Alternatively or additionally, the content generation module 226 can select the narrative tone based on one or more contextual factors associated with the real-world or virtual-world event, occurrence, person, place or thing (i.e., with the subject or topic of the new narrative content portion). Further, in some embodiments, the narrative tone can be selected based at least in part on a given portion of the selected narrative content template itself.

The content generation module 226 can next define a narrative content portion using the selected narrative content template. More specifically, the content generation module 226 can parse through the narrative content template and include, in the new narrative content portion, each plain language phrase included in the narrative content template. To preserve the substantive flow and order of the narrative content template, the content generation module 226 can parse each alphanumeric character of the narrative content template in order, successively and/or sequentially writing to the new narrative content portion each alphanumeric character. For example, if a first phrase of the selected narrative content template includes the text "It will be a meeting of two rivals," the content generation module 226 can accordingly include this text, in the above order, in the narrative content portion.

In defining the narrative content portion, the content generation module 226 can also, for each variable identifier included in the narrative content template, include, in a corresponding location/position within the new narrative content portion (and in lieu of the variable identifier itself), a statistic, datum, name, or other numerical or lexicographical value received from the database and corresponding to that variable identifier. For example, if a variable identifier included in a given location within the narrative content template is $HOME_TEAM_NAME, the content generation module 226 can include, in a corresponding location/position within the narrative content portion, a name of a home team for the relevant event (e.g., "Boston Celtics"). Thus, for the following example portion of a selected narrative content template: "The $HOME_TEAM_NAME will face the $AWAY_TEAM_NAME at $VENUE in $VENUE_LOCATION on $EVENT_DATE. at $VENUE_TIME", the content generation module 226 can define the following portion of the narrative content template: "The Boston Celtics will face the New York Knicks at Madison Square Garden in New York City, N.Y. on Apr. 10, 2011, at 7:05 pm." In this manner, by iterating through each text portion and variable identifier portion of the selected narrative content template, the content generation module 226 can combine generic text of the selected narrative content template with specific details, facts, statistics, etc. associated with the event ID to dynamically define a new narrative content portion.

Although not described above, in some embodiments, each phrase (e.g., portion of language and/or variable identifiers) included in the selected narrative content template can optionally be associated with multiple phrase variations. In such embodiments, the content generation module 226 can, for each phrase from the narrative content template, first select (e.g., randomly select, pseudo-randomly select) a single phrase variation from the multiple phrase variations associated with that phrase, and then write the text and/or data included in that selected phrase variation to the narrative content portion in lieu of the original phrase and/or phrase identifier included in the selected narrative content template.

In some embodiments, each phrase variation from the multiple phrase variations associated with a given phrase included in the selected narrative content template can be associated with a predefined and/or predetermined tone. For example, a given phrase variation of a first phrase included in the selected narrative content template can be associated with a positive, energetic tone, and as such can include text consistent with that tone. Another phrase variation of the first phrase can be associated with, for example, an apathetic tone, or, alternatively, a negative or other tone. In such instances, that phrase variation can include text consistent with the apathetic, negative, or other tone. In some embodiments, the content generation module 226 can select each phrase variation for inclusion in the new narrative content portion based at least in part on the narrative tone already selected for the entire new narrative content portion itself (as described above) and the tone of that phrase variation. Said differently, the content generation module 226 can select, for each phrase included in the narrative content template, a phrase variation whose narrative tone matches that of the new narrative content portion. In this manner, the content generation module 226 can define or "build" a new narrative content portion with a consistent narrative tone.

The network card 230 can be a hardware module (e.g., a wired and/or wireless Ethernet card, a cellular network interface card) configured to transmit information (e.g., data packets, cells, etc.) from and receive information at the content generation engine 200. As shown in FIG. 2, the network card 230 can be operatively and/or physically coupled to the processor 210. In this manner, the processor 210 can, via the network card 230, exchange information with one or more other devices via a network (e.g. the public network 110 discussed in connection with FIG. 1 above).

Figure 3:
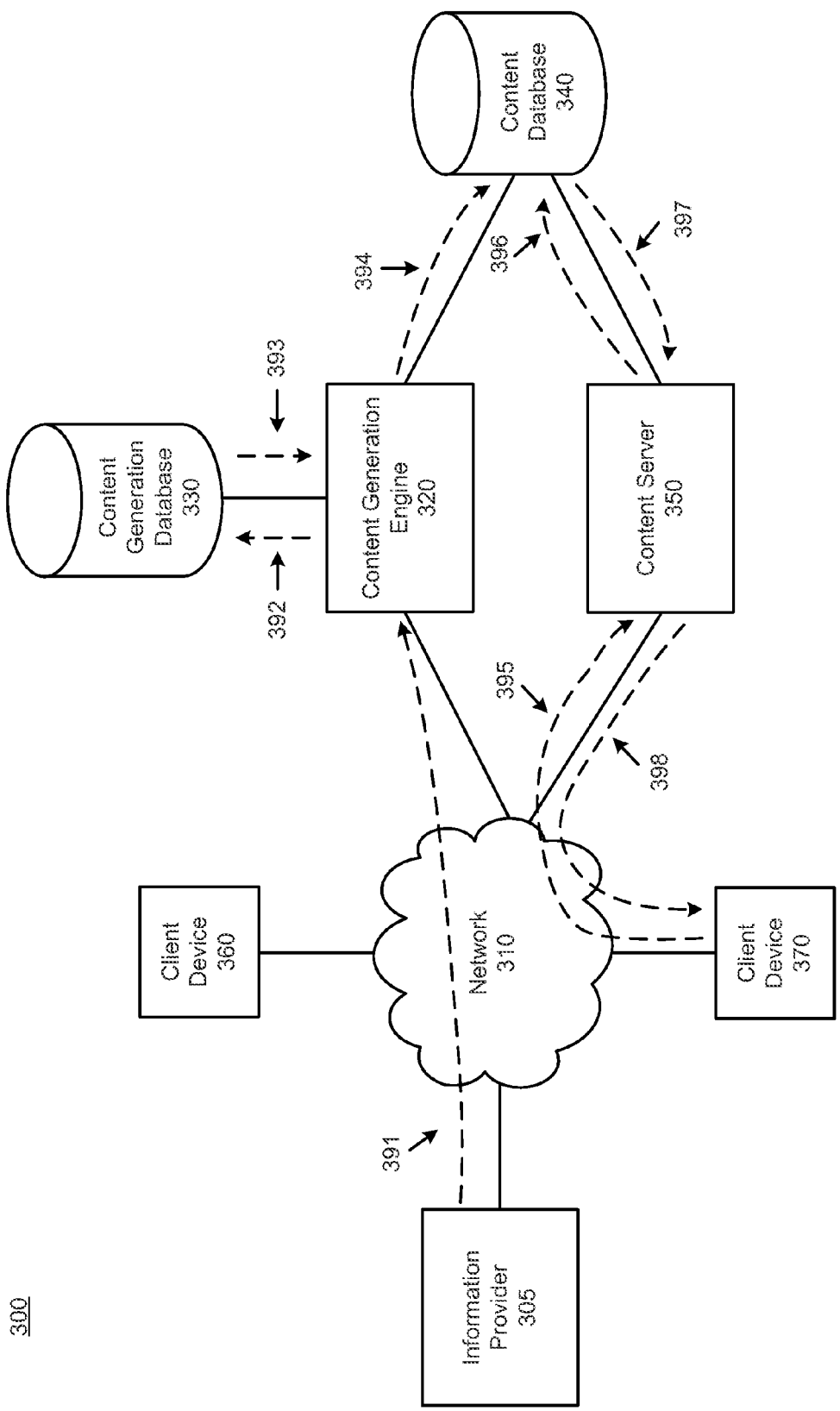
FIG. 3 is a schematic block diagram that illustrates a narrative content generation system, according to another embodiment.

FIG. 3 is a schematic block diagram that illustrates a narrative content generation system, according to another embodiment. More specifically, FIG. 3 illustrates a content generation engine 320 operatively coupled to an information provider 305 (via a network 310), a content generation database 330 and a content database 340. The content database 340 can be further coupled to a content server 350, which can itself be coupled, via the network 310, to a client device 360 and to a client device 370.

The information provider 305 can be any device, system, service and/or entity configured to provide (i.e., send) data, statistics, and/or other information associated with a given event, occurrence, fact, person, group of people, place, and/or thing. In some embodiments, the information provider 305 can be similar to the statistics provider 105 discussed in connection with FIG. 1 above. As shown in FIG. 3, the information provider can be operatively and/or physically coupled to the network 310, and to the content generation engine 320 and/or the content server 350 via the network 310. As further shown in FIG. 3, the information provider 305 can send information to the content generation 320 via one or more signals, data packets and/or data cells (e.g., the signal 391 discussed below).

The network 310 can be any computer or information network capable of marshalling and transmitting data between two or more hardware devices, such as the information provider 305, the client device 360, the client device, the content generation engine 320 and the content server 350. For example, the network 310 can be a local area network (LAN), a wide area network (WAN) or the Internet. In some embodiments, the network 310 can be comprised of one or more wired and/or wirelessly connected hardware devices. The network 310 can optionally be similar to the network 110 discussed in connection with FIG. 1 above.

The content generation engine 320 can be any combination of hardware and/or software (executing in hardware) configured to define one or more narrative content portions (e.g., articles, reports, summaries, reviews, previews, analyses, short-form reports, phrases, sentences, paragraphs, etc.). In some embodiments, the narrative content portions can be based at least in part on one or more narrative content templates received from the content generation database 330, information received from the information provider 305 and/or information received from the content generation database 330. In some embodiments, the content generation engine 320 can be similar to the content generation engine 120 described in connection with FIG. 1 above and/or to the content generation engine 200 described in connection with FIG. 2 above. As shown in FIG. 3, the content generation engine 320 can receive one or more signals (e.g., the signal 391) from the information provider 305 via the network 310. The content generation engine 320 can additionally exchange one or more signals (e.g., the signals 392 and 393) with the content generation database 330. As also shown in FIG. 3, the content generation engine 320 can exchange one or more signals (e.g., the signal 394) with the content database 340.

The content generation database 330 can be any combination of hardware and/or software (executing in hardware) storing one or more narrative content templates for use by the content generation engine 320 in defining narrative content. In some embodiments, the content generation database 330 can include statistics, data and/or other information associated with an event, one or more event participants, occurrence, person, place and/or thing for use by the content generation engine 320 in defining a new narrative content portion. The content generation database 330 can optionally be similar to the content generation database 130 discussed in connection with FIG. 1 above.

The content database 340 can be any combination of hardware and/or software (executing in hardware) storing one or more previously-generated narrative content portions defined and/or generated by the content generation engine 320. In some embodiments, the content database 340 can receive from the content generation engine 320 one or more signals including newly-defined narrative content for storage in a memory. The content database 340 can additionally exchange signals with the content server 350 so as to provide narrative content responsive to one or more queries received from the content server 350. In some embodiments, the content database 340 can be substantially similar to the content database 140 described in connection with FIG. 1 above.

The content server 350 can be any combination of hardware and/or software (executing in hardware) configured to retrieve and/or serve (i.e., send) narrative content. More specifically, as shown in FIG. 3, the content server 350 can send one or more requests for one or more narrative content portions and/or items to the content database 340. As also shown in FIG. 3, the content server 350 can accordingly receive one or more responses from the content database 340 including the requested one or more narrative content portions and/or items. As further shown in FIG. 3, the content server 350 can receive, via a network (e.g., the network 310), one or more requests for narrative content from one or more client devices (e.g., the client device 370). In some embodiments, the content server 350 can send one or more responses to a requesting client device, the responses including narrative content requested from that client device. In some embodiments, the content server 350 can be substantially similar to the content server 150 described in connection with FIG. 1 above.

Each of the client device 360 and the client device 370 can be any hardware client device and/or software client module configured to request, receive and/or display narrative content defined by the content generation engine 320. As shown in FIG. 3, each of the client device 360 and the client device 370 can send such requests and/or receive such responses from the content server 350 via the network 310. In some embodiments, any or each of the client device 360 and the client device 370 can be a personal and/or mobile computing device executing a web browser program or application. In some embodiments, any or each of the client device 360 and the client device 370 can be substantially similar to the client device 160 and the client device 170 described in connection with FIG. 1 above.

Although not shown in FIG. 3, in some embodiments, any or each of the information provider 305, the content generation engine 320, the content generation database 330, the content database 340, the content server 350, the client device 360 and/or the client device 370 can be comprised of multiple hardware devices and/or software modules.

As shown in FIG. 3, the information provider 305 can send a signal 391 to the content generation engine 320 via the network 310. The signal 391 can be or include, for example, an Ethernet packet, a data cell, and/or the like, and can include data, statistics and/or other information associated with a specified event (e.g., a sporting event), an occurrence (e.g., a news item), a person (e.g., a celebrity or other figure), a place and/or thing (e.g., a location, a derived metric or statistic, a weather observation or forecast, etc.) for subsequent use in defining narrative content. Although shown in FIG. 3 as being sent to the content generation engine 320, in some embodiments the signal 391 can be sent via the network 310 to the content generation database 330 for storage thereat and subsequent access by the content generation engine 320.

The content generation engine 320 can send a signal 392 to the content generation database 330. More specifically, the signal 392 can include a request for statistics and/or other information (e.g., a database request, such as a Structured Query Language (SQL) query) for use in defining new narrative content. In some embodiments, the request can include a reference identifier, such as an event ID associated with a real-world event or occurrence, a virtual-world event, etc. Alternatively, the request can include a subject ID associated with a subject or topic to be described in the new narrative content portion. Although not shown in FIG. 3, in some embodiments, the content generation engine 320 can receive the event ID and/or the subject ID based on user input. Alternatively, the content generation engine 320 can receive the event ID and/or the subject ID from the information provider 305. In some embodiments, the content generation engine 320 can send the signal 392 in response to one or more triggers, such as a termination of a given event associated with the event ID (e.g., a sporting event), a user request received at the content generation engine 320 (e.g., via an input peripheral of the content generation engine 320 or from a client device), a scheduled event included in a predefined schedule, etc.

As shown in FIG. 3, the content generation database 330 can also send a signal 393 to the content generation engine 320. The signal 393 can include, for example, a selected narrative content template or list of candidate narrative content templates. The signal 393 can also optionally include a set of phrase variations associated with a selected narrative content template. In some embodiments, the signal 393 can also include statistics, data and/or other relevant information for use by the content generation engine 320 in defining the new narrative content.

Upon receipt of the signal 393, the content generation engine 320 can define new narrative content based at least in part on the selected narrative content template and received information. In some embodiments, the content generation engine 320 can do so according to the process described in connection with FIG. 2 above and/or the process described in accordance with FIGS. 4-5 below.

Once it has defined the new narrative content based on the narrative content template and received statistics and/or other information, the content generation engine 320 can send a signal 394 to the content database 340. In some embodiments, the signal 394 can include the narrative content, an identifier (e.g., an event ID), a tone type associated with the narrative content, etc. In this manner, the content generation engine 320 can send the narrative content for storage at and subsequent retrieval from the content database 340.

As further shown in FIG. 3, the client device 370 can send a signal 395 to the content server via the network 310. In some embodiments, the signal 395 can include a request for narrative content. For example, the signal 395 can be a request formatted according to the Hypertext Transfer Protocol (HTTP) or other known protocol. In the example, the request can be sent from a web browser or other client application executing at the client device 370. In some embodiments, the request can include an identifier associated with the narrative content, such as an event ID or subject ID.

As shown in FIG. 3, the content server 350 can receive the signal 395. In some embodiments, the content server 350 can receive the signal 395 at a web server executing at the content server 350 and operatively coupled to the network 310. In some embodiments, the content server 350 can next send a signal 396 to the content database 340. In some embodiments, the signal 396 can include a database query/request for one or more narrative content items associated with, for example, an eventID specified by the signal 395. In this manner, the content server 350 can request, from the content database 340, a narrative content portion originally requested by a user of the client device 370.

The content database 340 can next send a signal 397 to the content server 350. In some embodiments, the signal 397 can include a narrative content portion responsive to the database query/request included in the signal 396. In some embodiments, the signal 397 can include Hypertext Markup Language (HTML) content for transmission to a web browser executing at the client device 370.

Upon receipt of the signal 397, the content server 350 can define a response to the signal 395 for transmission to the client device 370. The response can include, for example, a web page including the narrative content included in the signal 397 and/or other content type based thereon. Having defined the response, the content server 350 can send a signal 398 including the response to the client device 370 (via the network 310). Upon receipt of the signal 398, the client device 370 can optionally display the narrative content (included in, for example a web page) at a client application, such as a web browser executing at the client device 370.

Figure 4:
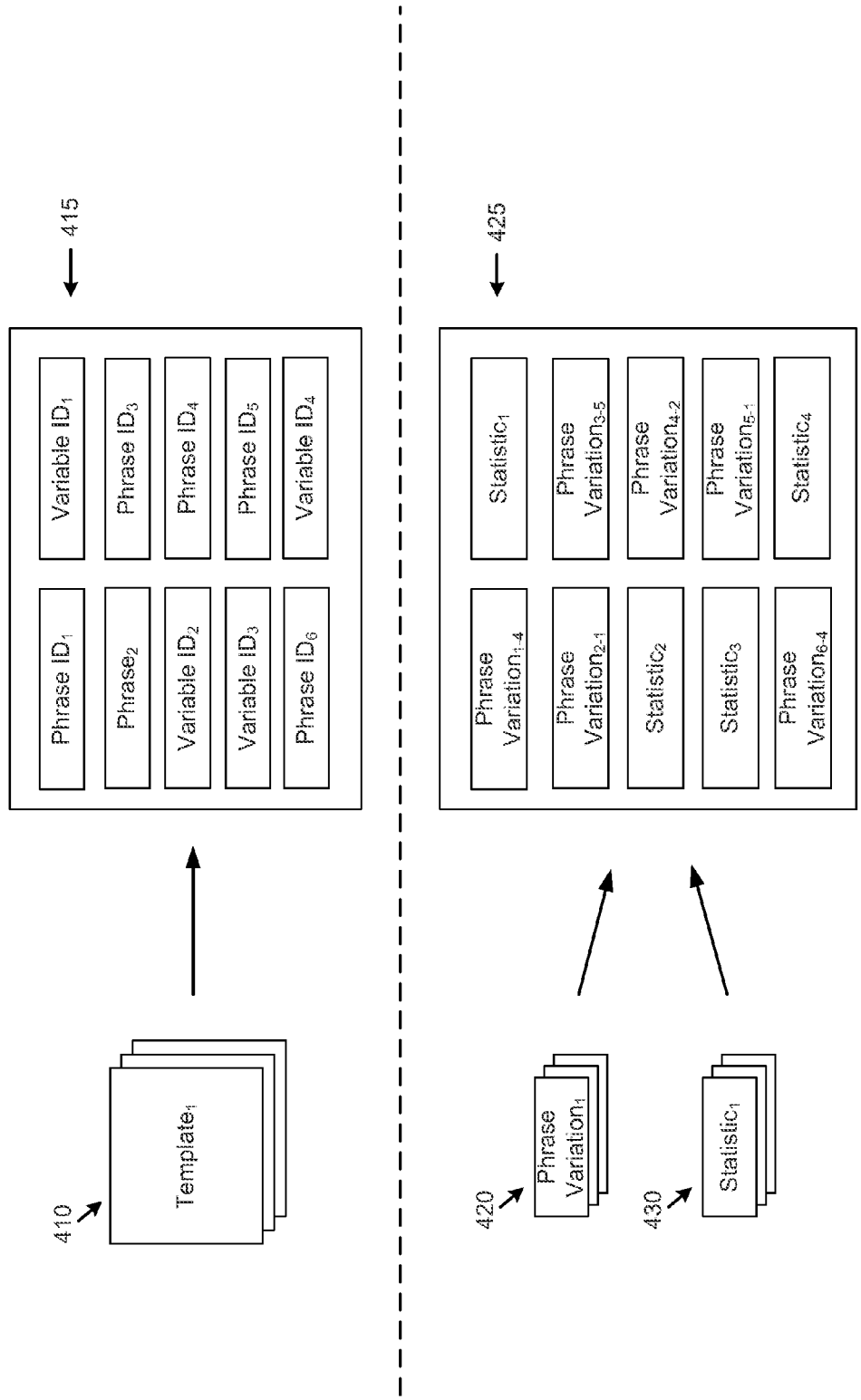
FIG. 4 is a block diagram that illustrates a method of selecting a narrative content template and defining a narrative content portion based thereon, according to another embodiment.

FIG. 4 is a block diagram that illustrates a method of selecting a narrative content template and generating/defining a new narrative content portion based thereon, according to another embodiment. More specifically, FIG. 4 illustrates a set of narrative content templates 410 and a selected narrative content template 415 from the set of narrative content templates 410. FIG. 4 further illustrates a set of phrase variations 420 associated with the selected narrative content template 415, a set of statistics 430 associated with a predetermined event ID or subject ID (not shown in FIG. 4) and a generated narrative content portion 425 based on the narrative content template 415, the set of phrase variations 420 and the set of statistics 430.

As shown in FIG. 4, a narrative content template 415 can be selected from the set of narrative content templates 410. The set of narrative content templates 410 can optionally include multiple narrative content templates, each of which is associated with a predetermined template type. For example, one or more narrative content templates from the set of narrative content templates 410 can be of any of the following template types: event preview, in-progress event update, event recap/summary, statistical analysis, progress report, etc. Each of the one or more narrative content templates from the set can also optionally be associated with a narrative tone, such as a positive tone, an optimistic tone, a hopeful tone, an energetic tone, an indifferent tone, a diplomatic tone, an angry tone, a pessimistic tone, a judgmental tone, or other tone type, and/or any combination thereof.

In some embodiments, the selected narrative content template 415 can be selected (e.g., by a content generation server such as the content generation engine 320 of FIG. 3) based at least in part on a match between a given content type associated with the event ID (or subject ID) and a template type of the selected narrative content template 415. Thus, the selected narrative content template 415 can be selected because it includes content matching a desired content type (e.g., a content type requested by a user and/or associated with the event ID/subject ID).

The selected narrative content template 415 can also be selected based at least in part on a match between a given narrative tone type and a narrative tone of the selected narrative content template 415. Thus, the selected narrative content template 415 can be selected because it includes content having a narrative tone matching a desired narrative tone type (e.g., a narrative tone type as determined/selected based on statistics and/or other information associated with the event ID/subject ID. In a more specific example, in a sports event context, the selected tone can be enthusiastic and positive when, based on the set of statistics 430, a given team participating in the sports event is a heavy favorite to win the sports event. Alternatively, in a financial news context, the selected tone can be emotional and negative when the set of statistics 430 indicates the occurrence or existence of a substantially negative financial and/or economic event, trend, etc.

As shown in FIG. 4, the narrative content template 415 can be a text-based document and/or file including a set of phrase indicators and/or variable indicators. For example, the narrative content template 415 can include a series of phrase IDs and variable IDs configured to allow generation of a new narrative content portion (e.g., a file) by a content generation module (e.g., the content generation module 226 of FIG. 2) based at least in part on the narrative content template 415.

The set of phrase variations 420 associated with the narrative content template 415 can include multiple phrase variations associated with each phrase ID included in the narrative content template 415. For example, the set of phrase variations 420 can include multiple phrase variations associated with the Phrase $ID_1$ included in the narrative content template 415, multiple phrase variations associated with the Phrase $ID_2$ included in the narrative content template 415, etc. In some embodiments, the set of phrase variations 420 associated with the narrative content template 415 can be a set of phrase variations further associated with the preselected tone. As shown in FIG. 4, the generated narrative content portion 425 can include a fourth phrase variation from the multiple phrase variations associated with Phrase $ID_1$ (denoted Phrase $Variation_{1-4}$). As also shown in FIG. 4, the narrative content portion 425 can include a first phrase variation from the multiple phrase variations associated with Phrase $ID_2$ (denoted Phrase $Variation_{2-1}$), etc.

One or more of the set of statistics 430 associated with the event ID (or subject ID) can be included, as appropriate, in the narrative content portion 425. As shown in FIG. 4, the narrative content portion 425 can include the $Statistic_1$, the $Statistic_2$, etc., each positioned within the narrative content portion 425 based on the position of a corresponding variable identifier (e.g., the $Variable_1$, the $Variable_2$, etc.) included in the narrative content template 415.

Figure 5:
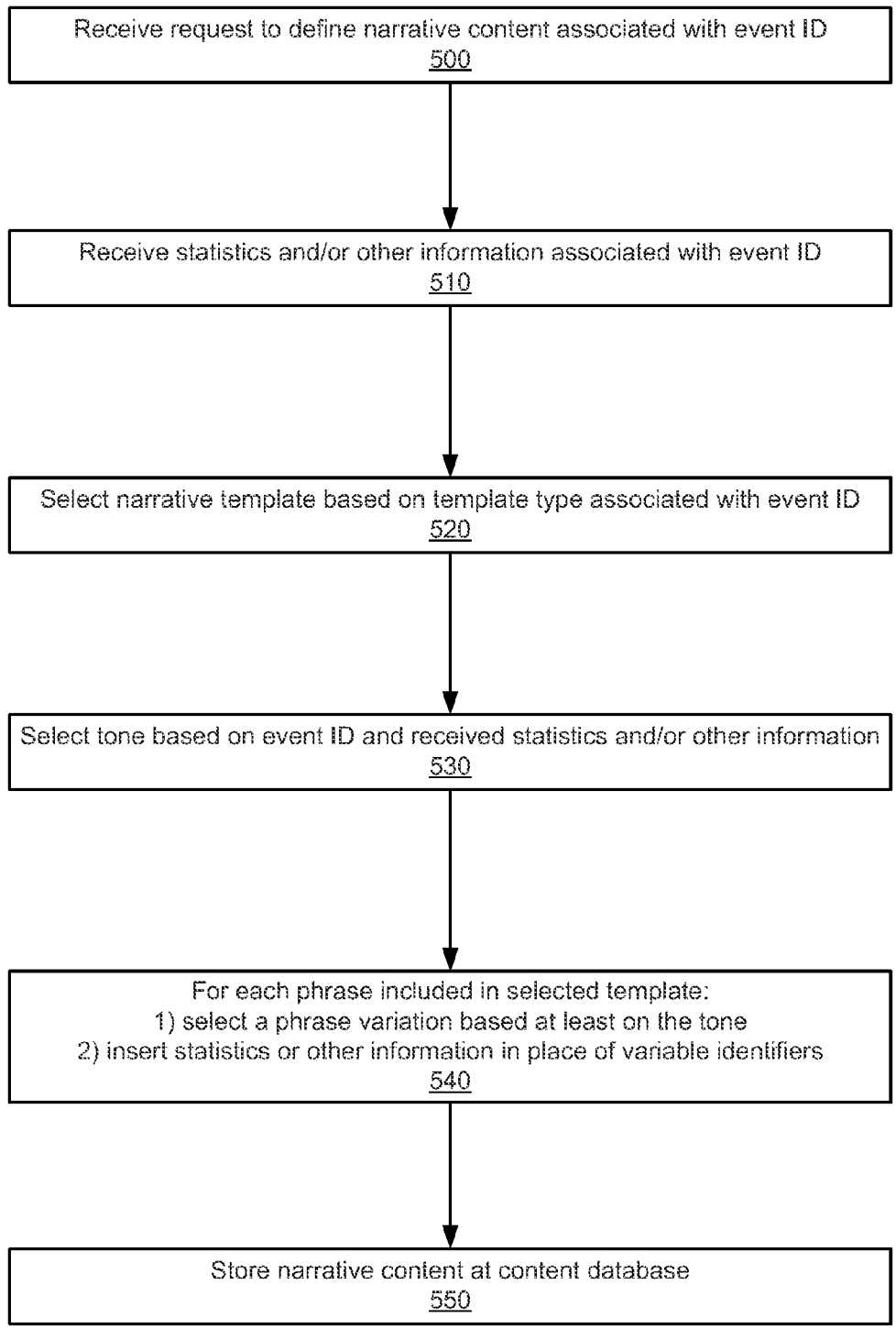
FIG. 5 is a flow diagram that illustrates a method of defining a narrative content portion based on an event ID, received statistics information, a selected narrative content template, a selected tone and a set of selected phrase variations, according to another embodiment.

FIG. 5 is a flow diagram that illustrates a method of defining a narrative content portion based on an event ID, received statistics information, a selected narrative content template, a selected tone and a set of selected phrase variations, according to another embodiment. In some embodiments, each selected phrase variation from the set of selected phrase variations can be associated with the selected tone and the selected narrative content template.

A request can be received to define narrative content associated with an event ID, 500. The request can be received at, for example, a server device operatively coupled to a network. In some embodiments, the request can be received via user input entered at a peripheral operatively and/or physically coupled to the server device, via one or more signals sent from another device (e.g., a client device). In some embodiments, the request can be based on a predetermined schedule or triggered in response to a real-world event or occurrence, such as a completion of an event, meeting, sports game or match, etc. In some embodiments, the request can be based triggered in response to a virtual-world event, such as a completion of a video game, a fantasy league (e.g., a fantasy sports league) competition or matchup, etc. In some embodiments, the event ID can be associated with a real-world event, such as a newsworthy event occurring in the real world. Alternatively, the event ID can be associated with a user-driven and/or user-initiated event, such as a request for narrative content associated with a person, place, and/or thing, etc. indicated by a user. In some embodiments, the event ID can be a subject ID or topic ID associated with a general subject-matter or topic. Alternatively or additionally, the event ID can be associated with a virtual-world event.

Statistics and/or other information associated with the event ID can be received, 510. For example, raw data, participant names, entity names, team names, identifiers, locations, dates and times, metrics, statistics, etc. associated with the event ID can be received at a server device configured to store information associated with multiple event IDs. In some embodiments, the received information can be statistics information associated with the event ID, such as sports statistics information associated with one or more leagues, venues, teams, players, games, matches, series, seasons, playoff series, etc. Alternatively, the received information can include relevant details or other information associated with an occurrence, happening, or event. Alternatively, the received information can include general and/or other information associated with a topic, subject, person, place and/or thing.

A narrative content template can next be selected based at least in part on a template type associated with the event ID, 520. For example, if the event ID is associated with a specific sporting event, the event ID can be associated with a narrative content template of any of the following template types: game preview, in-game progress report, game recap, tournament preview, tournament recap, etc. Alternatively, if the event ID is associated with a user-driven event, such as a user-driven request for long-form or short-form content associated with a user-specified person, place, thing, idea, etc., the narrative content template can be of a short-form report template type, of a comparison template type, etc. In some embodiments, the server device can randomly select or pseudo-randomly select a specific narrative content template of the template type. In some embodiments, the server device can alternatively receive a specific narrative content template from another device employing a random or pseudo-random narrative content template selection process based at least in part on the template type.

A narrative tone can next be selected based at least in part on the event ID and received statistics and/or other information, 530. More specifically, the server can determine, from among a predefined list of narrative tones (e.g., apathetic, confident, pessimistic, optimistic, positive, negative, enthusiastic, etc.) which narrative tone is appropriate based on the statistics and/or other information. For example, if the received statistics and/or other information reflects and/or indicates a negative occurrence, event, news item, or other piece of information or fact, the server can determine that the narrative content should have a negative narrative tone. Alternatively, if the received statistics information indicates a positive, unexpected occurrence, event, news item, etc., the server can determine that the narrative content should have a positive, surprised narrative tone. Although not discussed explicitly or shown in FIG. 5, the server can determine any appropriate narrative tone for the narrative content (e.g., by selecting from among a list of tones). Although described above as being determined after the selection of the narrative template, in some embodiments, the narrative tone can be determined before the selection of the narrative template, and can, accordingly inform the selection of the narrative template.

The narrative content can be defined by parsing the selected narrative content template and adding, to the narrative content, (1) a selected phrase variation for each phrase in the narrative content template and (2) a statistic or other information for each variable identifier included in each such selected phrase variation, 540. Said differently, the server can parse through the selected narrative content template, and progressively write out, to a memory, file, etc., appropriate portions of the narrative content based at least in part on the selected narrative content template.

In some embodiments, the server can, for example, employ a parser/writer module that parses through the narrative content template, considering in sequence (i.e., in order) each phrase included therein. For each phrase, the parser/writer module and/or another module executing at the server can select a phrase variation associated with both that phrase and the narrative tone selected in step 530 above. In this manner, the parser/writer module can ensure at least a minimal amount of variance in successive narrative content generation processes. Having determined a selected phrase variation for the current phrase, the parser/writer can write, to the narrative content, that selected phrase variation. In some embodiments, the parser/writer module can additionally replace any variable identifiers included in the selected phrase variation. To do so, the parser/writer module can (1) determine whether any of the received statistics and/or other information includes information corresponding to one of the variable identifiers, and, if so (2) write, to the narrative content, the corresponding statistic and/or other information in place of that variable identifier. By continuing this process for each phrase included in the narrative content template, the parser/writer module can generate the new narrative content portion based on the selected narrative content template, the new narrative content portion including specific and/or particular information associated with the given event, occurrence, user instruction, etc.

The narrative content can be stored at a database, 550. More specifically, in some embodiments, the server and/or the parser/writer module executing thereon, thereat, or therein can write the new narrative content portion to a memory, such as a database. In some embodiments, the database can be operatively and/or physically coupled to the server, or can be included at a memory included therein. In some embodiments, the database can be substantially similar to the content database 340 described in connection with FIG. 3 above. In such embodiments, the server can send the generated narrative content for storage thereat, such that the generated narrative content can be served in response to one or more user requests associated therewith (e.g., web browser requests, e-mail-based requests, text message-based requests, etc.).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a mobile device validation system can include multiple access servers configured to authenticate one or more mobile device users and/or to validate one or more client mobile devices.

What is claimed is:

1. A non-transitory processor-readable medium storing code representing instructions that when executed cause a processor to:

select a narrative template based at least in part on a predetermined content type associated with a real-world event;

select a narrative tone type based at least in part on a tone associated with the real-world event; and for each phrase included in an ordered set of phrases associated with the narrative template:

select, based at least in part on the narrative tone type, a phrase variation from a set of phrase variations associated with that phrase;

define, based on the selected phrase variation and at least one datum from a set of data, a narrative content portion associated with the real-world event; and send a signal such that the narrative content portion is output at a display.

2. The non-transitory processor-readable medium of claim 1, wherein the narrative tone type is selected based at least in part on at least one of:
- a portion of the narrative template;
- the set of data;
- the predetermined content type; and
- a calculation based at least in part on one or more contextual factors associated with the real-world event.

3. The non-transitory processor-readable medium of claim 1, wherein the narrative template is one of a set of narrative templates associated with the predetermined content type, and
the narrative template is selected based at least in part on a pseudo-random selection process.

4. The non-transitory processor-readable medium of claim 1, wherein the narrative template includes text content associated with a theme, the theme being associated with the real-world event.

5. The non-transitory processor-readable medium of claim 1, wherein the real-world event is a sporting event including at least two opponents.

6. The non-transitory processor-readable medium of claim 1, wherein the narrative tone type is selected based at least in part on a recent performance of at least one of:
- a sports team; and
- an athlete.

7. The non-transitory processor-readable medium of claim 1, wherein the code further represents instructions that when executed cause the processor to:
store, at a memory, the narrative content portion.

8. A non-transitory processor-readable medium storing code representing instructions that when executed cause a processor to:
receive a sports event identifier (ID) associated with a sports event;
receive a first participant ID associated with the sports event ID;
receive a second participant ID associated with the sports event ID;
receive a statistic value associated with the first participant ID; and
define, based on a content template, a content portion including:
  a name of a first participant associated with the first participant ID;
  a name of a second participant associated with the second participant ID;
  the statistic value; and
  text associated with the sports event, the text based at least in part on a plurality of text elements associated with the content template, each text element from the plurality of text elements being associated with a preselected narrative tone, the preselected narrative tone being based at least in part on a tone associated with the sports event.

9. The non-transitory processor-readable medium of claim 8, wherein each text element from the plurality of text elements is associated with a predefined author style.

10. The non-transitory processor-readable medium of claim 8, wherein the preselected narrative tone is determined based on at least one of:
- a recent performance of the first participant;
- a recent performance of the second participant;
- a ranking of the first participant;
- a ranking of the second participant; and
- a physical location of the sports event.

11. The non-transitory processor-readable medium of claim 8, wherein the preselected narrative tone is at least one of:
- confident;
- pessimistic;
- optimistic; or
- apathetic.

12. The non-transitory processor-readable medium of claim 8, wherein each text element from the plurality of text elements is one of:
- a phrase;
- a sentence; or
- a paragraph.

13. A method, comprising:
receiving an instruction to define a narrative content portion based at least in part on an event;
receiving, from a database, a plurality of data associated with the event;
selecting, based on a narrative tone type that is based on the event, a narrative content template including a plurality of variable identifiers;
defining the narrative content portion based at least in part on a combination of:
  a text portion of the narrative content template, the text portion being based on the narrative tone type; and
  for each variable identifier from the plurality of variable identifiers, a datum from the plurality of data associated with that variable identifier; and
sending a signal such that the narrative content portion is output at a display.

14. The method of claim 13, wherein each variable identifier from the plurality of variable identifiers is included at a predefined position within the text portion of the narrative content template, the defining further including:
writing, to a memory and in sequence, 1) each character from the text portion of the narrative content template and 2) each datum from the plurality of data based on the variable identifier from the plurality of variable identifiers with which the datum is associated.

15. The method of claim 13, wherein the event is at least one of:
- a news event;
- a weather event;
- a financial event; or
- a sports event.

16. The method of claim 13, wherein the plurality of data is received in substantially real-time.

17. The method of claim 13, wherein the narrative content portion is one of:
- an event summary;
- an event recap; or
- an event preview.

18. The method of claim 13, wherein the narrative content template is selected based at least in part on user input.

19. The method of claim 13, wherein the plurality of data includes prior performance data associated with an event participant.

20. The method of claim 13, wherein the instruction is received in response to one of:
- a termination of the event; or
- a predetermined schedule.

21. The method of claim 13, wherein the narrative content template is associated with a current event and the plurality of data is associated with a historical event.

22. The method of claim 13, wherein the narrative content portion is associated with an in-progress event.

23. The method of claim 13, wherein the narrative content template is associated with a player performance during an in-progress sporting event, and the plurality of data is associated with historical statistics associated with the player.

24. The method of claim 13, wherein the narrative content portion is output in response to an e-mail request.

25. The method of claim 13, wherein the narrative content portion is associated with a virtual event.

26. The method of claim 13, wherein the narrative content template is associated with a virtual event and the plurality of data is associated with a real-world event, the plurality of variable identifiers being selectively associated with the narrative content template.

27. The method of claim 13, wherein the plurality of variable identifiers are selectively associated with a narrative content template based on a user input.

* * * * *